FIG. 1.

INVENTORS
WERNER E. ALTMANN
KURT ENKE
MANFRED H. BURCKHARDT

BY Dicke, Craig & Freudenberg
ATTORNEYS

INVENTORS
WERNER E. ALTMANN
KURT ENKE
MANFRED H. BURCKHARDT
BY *Dicke, Craig & Freudenberg*
ATTORNEYS

United States Patent Office 3,129,794
Patented Apr. 21, 1964

3,129,794
CLUTCH CONSTRUCTION
Werner E. Altmann, Stuttgart, Kurt Enke, Fellbach, Stuttgart, and Manfred H. Burckhardt, Waiblingen, Germany, assignors to Daimler-Benz Aktiengesellschaft, Stuttgart-Unterturkheim, Germany
Filed Sept. 14, 1960, Ser. No. 56,047
Claims priority, application Germany Sept. 16, 1959
43 Claims. (Cl. 192—.07)

The present invention relates to a disengageable clutch, especially to a force-locking main clutch for motor vehicles whereby an axially movable part is arranged at one of the clutch parts and is provided with engaging surfaces for engagement with the other clutch part, and in which there are provided means for achieving synchronism as well as means for blocking the force-locking engagement until synchronism is attained between the two clutch parts.

Additionally, the present invention relates to a centrifugal clutch construction, especially for motor vehicles, in which the axially movable part which includes a pressure disk subjected to the influence of the clutch-engaging springs is prevented from engagement with the clutch disk by means of spring-loaded fly-weights and is released only above a predetermined rotary input or driving speed for purposes of engagement thereof.

Disengageable clutches of the type mentioned hereinabove are known in the prior art as synchronizing clutches for motor vehicle change-speed transmissions. Such clutches are intended to be improved in accordance with the present invention to the effect that, during change of the direction of rotation, no reversal play or backlash occurs any longer between the surfaces serving for the production of the axial thrust. Additionally, the clutch in accordance with the present invention is intended to satisfy and do full justice to the special requirements and demands of a main clutch for a motor vehicle.

This is achieved in accordance with the present invention with the clutches of the type mentioned hereinabove by supporting the axially movable part and the driving clutch part with respect to each other along inclined surfaces for producing an axial thrust effective in the engaging direction from the friction moment and by retaining the inclined surfaces constantly in mutual abutment against one another by tangentially effective spring forces.

The present invention thereby entails the advantage that a tangential play between the inclined surfaces can no longer appear. As a result thereof, the clutch in accordance with the present invention becomes utilizable, together with still further advantages to be explained more fully hereinafter, additionally as main clutch for motor vehicles.

According to the present invention, inclined surfaces are appropriately arranged at the driving clutch part which are provided, in a manner known per se, with a lesser inclination or slope for the synchronization position than for the force-locking position thereof whereby radially extending cylindrical pins are arranged at the axially movable part for cooperation with these inclined surfaces. The axially movable part is thereby pretensioned with respect to the driving clutch part by several, essentially tangentially arranged springs against the forward direction of rotation and this pretension is larger than the thrust torque of the engine.

With such a construction, the cylindrical pins abut always at the inclined surfaces with a pulling as well as with a pushed engine so that an axial thrust is produced in the engaging direction from this tangential spring and also always during the occurrence of a friction moment or torque. Advantageously, one or several springs axially effective in the engaging direction are arranged between the driving clutch part and the axially movable part the pretension of which together with the axial thrust produced by the inclination of the surfaces having a smaller inclination from the friction torque and the tangential spring are so matched that in the synchronizing position thereof only a limited torque can be transmitted which lies below the maximum engine torque. As a result thereof, during shifting, the clutch becomes effective as synchronizing clutch and any shifting shock is effectively avoided thereby.

However, in order to avoid racing of the engine during so-called shifting under gas, i.e., while giving gas, according to a further feature of the present inventive concept, an auxiliary spring which becomes effective during actuation of the engine control member, for example, of the gas pedal is coordinated to or operatively connected with the axially movable part which auxiliary spring reinforces the pressure effective in the engaging direction on the axially movable part to such an extent that already in the synchronization position the full engine torque may also be transmitted.

The present invention is suited in particular for such motor vehicle main clutches in which the axially movable part which includes a pressure disk or with which a pressure disk is operatively connected, is released, for purposes of engagement, by one or several spring-loaded fly-weights disposed within the driving clutch part only above a predetermined rotary speed of the latter. With such clutches, a pressure disk structure effective simultaneously as synchronizing means is operatively connected in accordance with the persent invention with the axially movable part for limited relative rotary movement by means of blocking surfaces, and this pressure disk is adapted to be moved by the axially movable part beyond the stroke of the fly-weights in the disengaging direction thereof.

In general, with one type of known fly-weight clutches of the prior art, the fly-weights are ordinarily constructed as ball members or other roller bodies which act by means of inclined surfaces at the driving clutch part and the clutch pressure disk on the same in a manner, known per se. In the alternative, the fly-weights of the prior art are constructed as levers and are rotatably supported in special bearings. However, all of these prior art constructions are disadvantageous because of the friction forces which occur at the inclined surfaces or in the bearings of the fly-weights whereby the difference between rest or stationary and sliding friction becomes noticeable additionally in a particularly annoying manner.

The present invention is, therefore, additionally concerned with the task to eliminate the aforementioned disadvantages normally encountered in all centrifugal clutch constructions of the prior art. This is achieved in the centrifugal clutch construction of the present invention by supporting the fly-weights along an edge extending essentially tangentially to the clutch axis in the manner of a knife-edge suspension within the part of the clutch rotating with the driving or input member thereof. The edges serving as knife-edge bearing may be arranged at the fly-weight or at the clutch part, and the abutment surface may be provided with a plane surface or with a groove having a wedge-like cross section. An edge of the fly-weight itself serves appropriately as knife-edge bearing with a plane abutment surface provided at the driving clutch part which surface extends perpendicularly to the axis of the clutch whereby the corners of this edge are radially supported at the driving clutch part.

In one construction of the centrifugal clutch in accordance with the present invention, several fly-weights are arranged along sectors or over the entire periphery of the driving clutch part directly adjacent one another in such a manner that the edges serving as knife-edge bearing form a regular polygon within the circumference of the driving clutch part.

The advantage of the centrifugal clutch construction in accordance with the present invention resides primarily in the fact that all friction is effectively and completely avoided within the bearings of the centrifugal fly-weights. Since the difference between stationary and sliding friction can no longer become effective, a very clean, smooth and continuous transition during operation of the fly-weights can be achieved. Additionally, a structurally favorable arrangement results therefrom which permits the use of relatively very many fly-weights along a relatively small diameter.

For purposes of actuating the pressure disk of the clutch, the fly-weights according to the present invention have an edge portion, a projection, a nose portion, or the like by means of which they act on a flange provided on the axially movable clutch assembly or on a part thereof such as the pressure disk. Appropriately, the edge serving as knife-edge bearing is thereby disposed radially outwardly and the edge serving for the actuation of the axially movable clutch part or pressure disk is disposed radially inwardly whereby both edges extend parallelly to one another.

The fly-weights themselves may be of any desired form and shape. However, they are appropriately constructed of approximately block-like shape and are provided with a pot-shaped recess for accommodating therein a coil spring which is arranged within the knife-edge bearing, extends approximately parallelly to the clutch axis, and is supported at the bottom of the recess within the fly-weight and at the driving clutch part. A tangential guidance of the fly-weights, for example, by means of pins arranged within the area of the knife-edge support is also appropriate.

Moreover, in order to achieve a so-called free-wheeling effect below the seizing or gripping rotational speed of the fly-weights, the pressure disk assembly is pretensioned in the forward direction of rotation by one or several springs and is placed into abutment with special wedging surfaces against corresponding complementary counter surfaces at the axially movable part. The wedging surfaces may be combined structurally with the blocking surfaces and may be arranged at the claw members or counter claw members of the pressure disk and of the axially movable part, respectively, in such a manner that the wedging surfaces come into effective abutment only when the axially movable part is lifted off the pressure disk by the fly-weights.

As a result of such a construction, there is achieved a practical realization whereby the engine may be called upon also below the gripping or seizing speed of the fly-weights for purposes of braking the vehicle. On the other hand, as the vehicle slows down to a point where its speed becomes too low, there exists a free-wheeling condition, and as a result thereof the engine cannot be stalled. Additionally, with such an arrangement, the stationary engine may be started by pushing or pulling the vehicle.

According to a further feature of the present invention, the clutch pressure disk is operatively connected so as to be non-rotatable but axially movable with respect to a counter-plate which is disposed on the opposite side of the clutch disk forming the other clutch part and which is supported by roller bearings at the driving clutch part. The counter-plate and the pressure disk are operatively connected with each other by claw members with the interposition of balls or other roller bodies.

As a result of such a construction, there is achieved that both sides of the clutch disk are rendered effective for purposes of producing the axial thrust from the friction or rotary torque. The roller bearing thereby precludes any sizeable losses in the transmission of force. Additionally, the free-wheeling spring may be arranged thereby more readily between the counter-plate and the driving clutch part.

Accordingly, it is an object of the present invention to provide a disengageable clutch, especially a force-locking, centrifugally actuated main clutch for motor vehicles, which avoids all the disadvantages and shortcomings of the prior art constructions mentioned hereinabove.

It is another object of the present invention to provide a force-locking disengageable clutch which is operative, with extremely simple means, to obtain in a very reliable manner both synchronism as well as a blocking effect precluding the force-locking engagement of the clutch until synchronism exists between both clutch parts.

A further object of the present invention resides in the provision of a disengageable force-locking clutch in which no back-lash or reversal play exists between the parts producing the axial thrust during a change in the direction of relative rotation of the parts thereby avoiding the otherwise existing clicking noises.

Still another object of the present invention resides in the provision of a disengageable, force-locking clutch provided with slanted or inclined surfaces for producing an axial thrust effective in the engaging direction from the friction torque between the clutch parts in which any tangential play between the inclined surfaces is effectively eliminated.

A further object of the present invention resides in the provision of a disengageable clutch, especially a force-locking main clutch for motor vehicles, in which the parts and surfaces are so arranged and constructed that in the synchronizing position thereof only a limited torque can be transmitted which lies below the maximum engine torque so as to render the clutch effective as synchronizing clutch during shifting of the change-speed transmission and thereby effectively avoid any shifting shocks.

Another object of the present invention is the provision of a disengageable force-locking clutch in which additional means are provided reinforcing the pressure on the axially movable part in the engaging direction to such an extent that already in the synchronizing position the full engine torque can be transmitted in order to avoid racing of the engine during shifting of the change speed transmission while giving gas.

A still further object of the present invention resides in the provision of a disengageable force-locking clutch in which means are provided to prevent the pressure disk of the clutch from engaging the clutch disk below a predetermined driving speed of the engine and in which engagement of these parts is released only upon attaining a predetermined speed in the driving part of the clutch.

Another object of the present invention resides in the provision of a centrifugal clutch which minimizes any friction in the actuating parts thereof as well as any difference between stationary and sliding friction so as to assure smooth continuous operation thereof by effectively eliminating any such difference between the so-called stationary and sliding friction.

Another object of the present invention resides in the provision of a centrifugal clutch arrangement in which essentially frictionless bearings are provided in the form of knife edge supports for the fly-weights to thereby improve the overall performance of the clutch arrangement.

Still another object of the present invention resides in the provision of a centrifugal clutch which enables a favorable spatial arrangement of relatively numerous fly-weights on a relatively small diameter.

A further object of the present invention resides in the provision of a disengageable, force-locking clutch, especially for motor vehicles in which speed responsive means are provided exercising a control influence on the clutch and in which the various parts are so arranged and constructed as to assure smooth operation of the clutch by effectively minimizing the friction in the movable parts of the speed responsive control means.

Still another object of the present invention resides in the provision of a disengageable clutch of the force-locking type producing a free-wheeling effect below the rotary speed of the speed responsive means at which the speed responsive means become effective, and in which means are provided so as to make possible to utilize the engine for purposes of braking the vehicle even below this rotary speed.

Another object of the present invention resides in the provision of a disengageable, force-locking clutch in which notwithstanding the possibility of utilizing the engine as a brake at essentially all speeds, the free-wheeling effect rendered inoperative for that purpose is made to reappear under certain operating conditions to preclude stalling of the engine when the speed of the vehicle becomes excessively low.

Still a further object of the present invention resides in the provision of a disengageable force-locking clutch fulfilling all of the objects mentioned hereinabove in which the parts may be readily assembled and installed or removed for purposes of repair.

These and other objects, features and advantages of the present invention will become more obvious from the following description when taken in connection with the accompanying drawing which shows, for purposes of illustration only several embodiments in accordance with the present invention and wherein:

Figure 1:
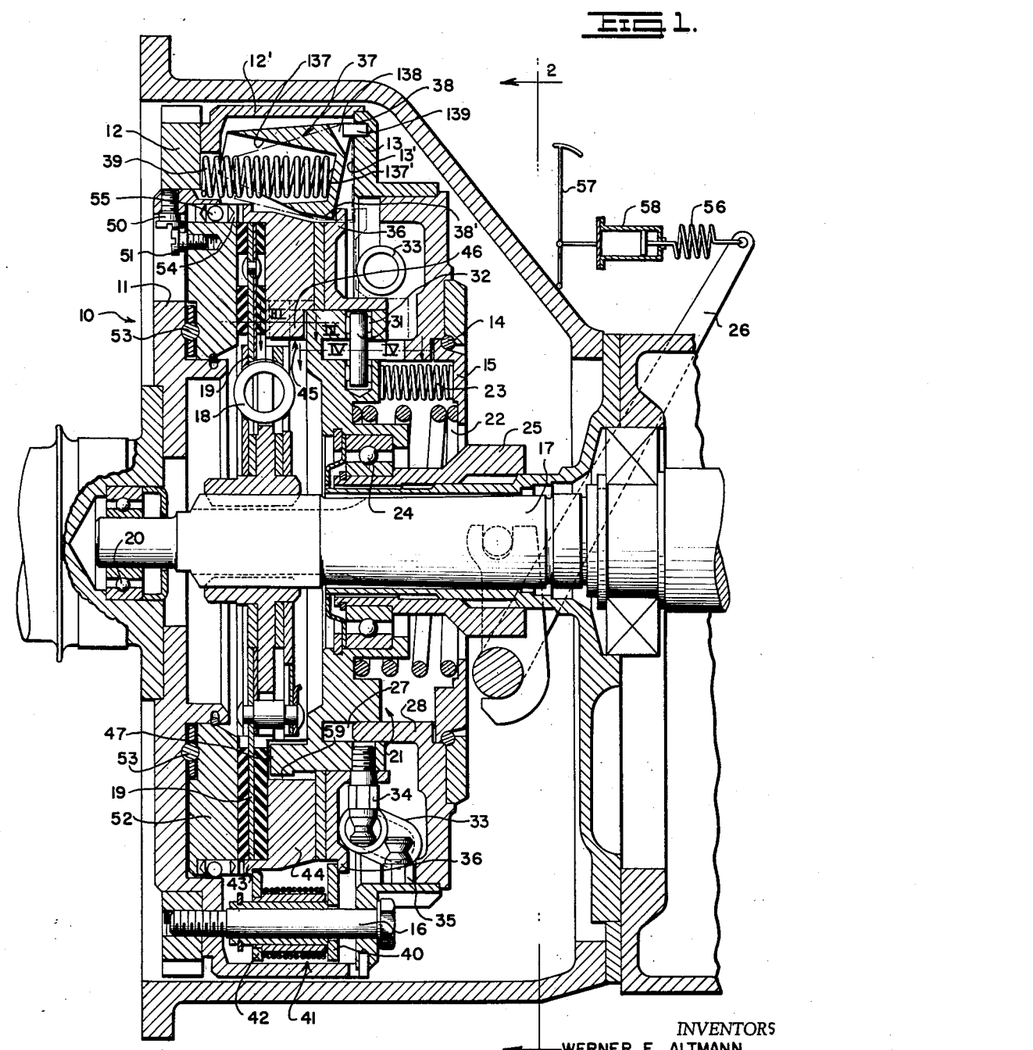
FIGURE 1 is an axial longitudinal cross-sectional view through a clutch construction in accordance with the present invention.
Figures 2, 3, 4:
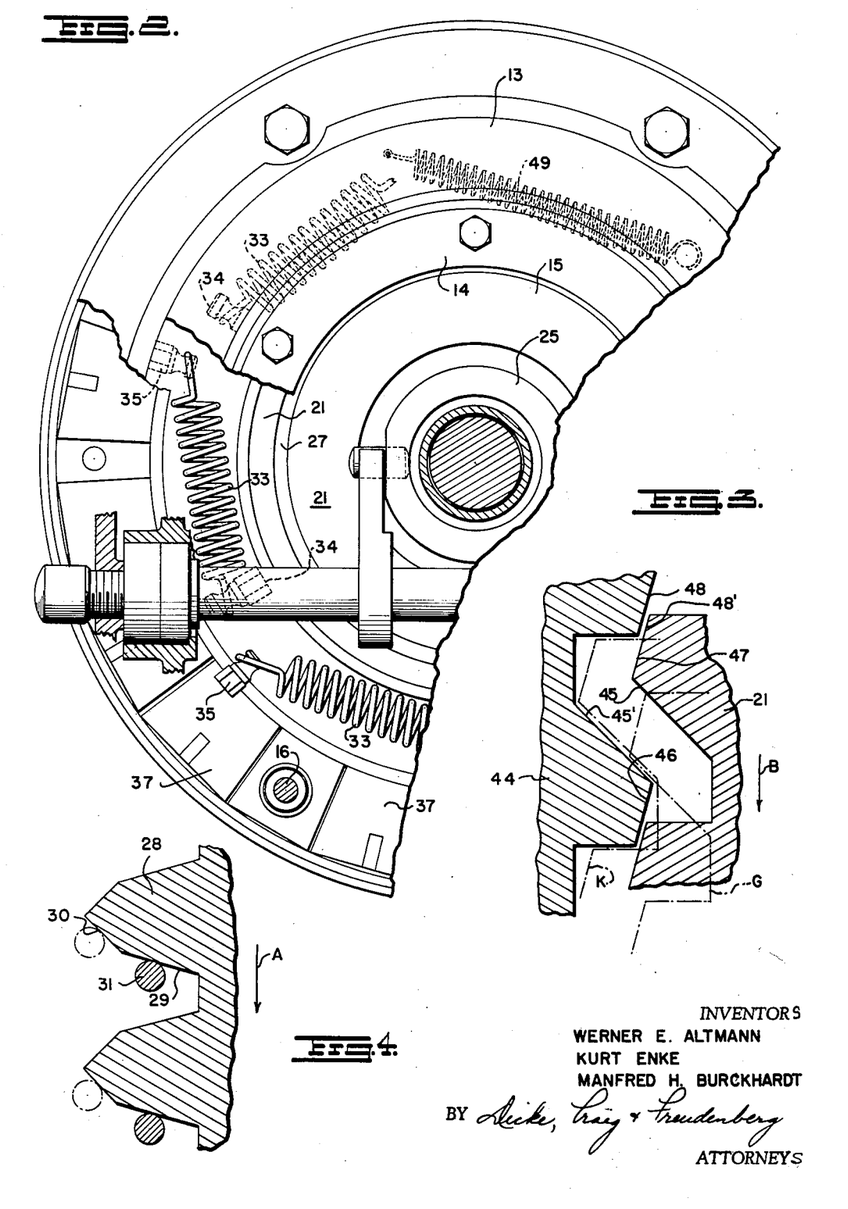
FIGURE 2 is a cross-sectional view of the clutch construction of FIGURE 1, taken along line II—II.
FIGURE 3 is a schematic cross-sectional view through the blocking surfaces taken along line III—III of FIGURE 1 and showing the blocking surfaces developed in a single plane.
FIGURE 4 is a partial cross-sectional view through the inclined surfaces taken along line IV—IV of FIGURE 1 and showing a portion of the inclined surfaces developed in a single plane.

Referring now to the drawing wherein like reference numerals are used throughout the various views, and more particularly to FIGURES 1 and 2, the clutch illustrated therein essentially consists of the driving clutch part generally designated by reference numeral 10 which is operatively connected with the engine. The driving clutch part 10 includes, in particular, a part 11 constituting, for example, the fly-wheel, a starter ring gear 12, a drum-shaped part 12' and a bell-shaped cover 13. The cover 13 itself is constructed of two parts and accommodates centrally thereof a counter-plate 15 by means of roller bearing 14. The parts 11, 12, 12' and 13 of the driving clutch part 10 are secured with each other by means of appropriate bolts 16.

The other clutch part is formed by the driven or output shaft 17 which at the same time may constitute, in a manner not shown in detail herein, the input shaft to a motor vehicle change-speed transmission. The clutch disk 19 is secured on the output shaft 17 by the interposition of vibration-damping or vibration-absorbing intermediate members 18 of any suitable known construction. The shaft 17 may be supported within the engine shaft or the driving clutch part 10 by means of a suitable bearing 20.

An axially movable part generally designated by reference numeral 21 is connected with the driving clutch part 10 in such a manner that a transmission of torque is possible. The axially movable part 21 is pretensioned in the direction of engagement by springs 22 and 23 which are supported against the counter-plate 15. The axially movable part 21 is rotatably supported on the hub portion 25 by means of bearing 24 while a disengaging lever 26, to be described more fully hereinafter, is operatively connected with and acts on the hub part 25.

An axially-extending, cylindrically-shaped groove or cut-out portion 27 is provided within the axially movable part 21. Axially directed tooth-like projections 28 (FIGURE 4) or the like engage into the groove 27 which projections 28 are secured at the lid 13 or are integrally formed thereby. Inclined surfaces 29 and 30 are provided along these tooth-like projections 28 as shown in FIGURE 4 whereby the former have a smaller inclination and the latter a larger inclination with respect to the axis of the clutch. Cylindrical pin members 31 abut against these inclined surfaces 29 which cylindrical pin members 31 are supported at both ends thereof within the movable part 21 by means of roller bearings 32 (FIGURE 1).

Several tangential springs 33 evenly distributed over the periphery retain the pin members 31 in constant abutment against the inclined surfaces 29 or 30 whereby simultaneously therewith an axial thrust in the engaging direction is produced thereby. The springs 33 are hooked into pins 34 provided in the movable part 21 and into pins 35 of the cover 13 (FIGURES 1 and 2). The arrangement is thereby made in such a manner that, with a pulling or driving engine rotating in a direction indicated by arrow A in FIGURE 4, the projections 28 push the cylindrical pin members 31 in front thereof whereas, with a pushed or driven engine, the transmission of force takes place from the cylindrical pin members 31 to the clutch part 10 through the tangential springs 33 the pretension of which has to be, therefore, greater than the thrust moment of the engine.

The axially movable part assembly 21 is provided radially outwardly thereof with a flange 36 against which abut several fly-weights 37 with an edge, projection or the like thereof. The flange portion 36 may thereby be constituted by a separate flange member suitably secured to the axially movable member 21, for example, by means of pins 34.

While the actuation of the disengageable, force-locking clutch in accordance with the present invention may take place selectively by means of the disengaging lever 26, as will be described more fully hereinafter, ordinarily the actuation thereof takes place by means of fly-weights generally designated by reference numeral 37 which are arranged within the outer drum-shaped part 12' of the driving clutch half 10. As mentioned hereinabove, the axially movable part 21 is provided radially outwardly thereof with a flange member 36 for cooperation with the fly weights 37 and against which the fly weights 37 abut with the edges 38' thereof, or with an extension, projection, nose portion or the like.

Figure 6:
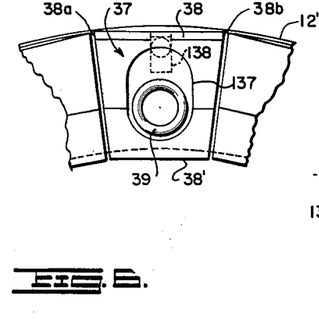
FIGURE 6 is a partial elevation view taken in the direction of the arrow VI in FIGURE 1 and illustrating certain details of the flyweight arrangement in accordance with the present invention.

The fly-weights generally designated by reference numeral 37 are thereby disposed closely adjacent one another as may be readily seen from FIGURES 2 and 6. They may be arranged within predetermined sectors distributed over the periphery of the drum-shaped part 12' if, intertermediate these sectors, the bolt members 16 have to be accommodated for securing together the parts 11, 12, 12' and 13 of the driving clutch half 10. However, they may also occupy the entire periphery if the securing problem of these parts is solved in any other suitable manner. The individual fly-weights 37 are constructed in a block-shaped manner and are provided with a tangentially extending edge 38 by means of which the fly-weights 37 are supported in the manner of a knife edge bearing on the bell-shaped cover 13.

The edges 38 thereby form a knife-edge bearing for the fly-weights 37 and abut against the surface 13' of the bell-shaped cover 13 which surface 13' extends essentially perpendicularly to the axis of the clutch. As may be readily recognized from FIGURE 6, the corners 38a and 38b of the edge 38 serving as knife edge bearing abut against the inner periphery of the drum shaped part 12' so that the fly-weights 37 are supported securely in the outward direction thereof. The edges 38 of all fly-weights 37 form together a regular polygon within the periphery of the drum shaped part 12'.

For tangentially securing the fly-weights 37 a slot 138 (FIGURE 6) is provided within the area of the edge 38 into which engages a pin member 139 secured within the bell shaped cover 13. One coil spring 39 each which extends essentially parallelly to the clutch axis is coordinated to each fly weight 37 within the knife edge bearing thereof. For that purpose, each fly-weight 37 is provided with a recess 137 between the two edges 38 and 38' which accommodates the largest portion of the spring 39 which, in turn, is supported at one end thereof against the bottom surface 137' of the recess 137 and, at the other end thereof, against the driving clutch half 10, and more particularly against the flywheel 11 or, as shown in FIGURE 1, against the starter ring gear 12. However, while the springs 39 have been shown substantially parallel to the axis of the clutch, it is understood that each spring 39 may also be arranged so as to be inclined with respect to the clutch axis, possibly also perpendicularly with respect thereto whereby the recesses 137 within the fly-weights 37 have to have a corresponding position.

FIGURE 1 illustrates the engaged position of the centrifugal clutch, i.e., the fly-weights 37, with a relatively higher rotational speed, are pivoted clockwise outwardly about the edge 38 serving as knife edge bearing as a result of the centrifugal force occurring under these circumstances. At the same time, the fly-weights 37 release with the inner edges 38' thereof the axially movable part 21, 36 and therewith effectively also the clutch pressure disk 44 and the axially movable assembly 21, 36, 44 is pressed securely by springs 22 and 23 against the clutch disk 19 connected with the output shaft 17 in a manner that will be described more fully hereinafter. Appropriately, the stroke of the fly-weights 37 is thereby larger than the stroke of the axially movable part 21 and pressure disk 44.

If the rotational speed of the driving clutch half 10 falls below a predetermined value, then the centrifugal force acting on the fly-weights 37 becomes smaller than the force exerted thereon by the springs 39. As a result thereof, the springs 39 pivot the fly-weights 37 about the edge 38 serving as knife edge bearing counterclockwise and inwardly into the position indicated in FIGURE 1 in the dot and dash position. At the same time, the flange member 36 of the axially movable member 21 is taken along in the axial direction by the inner edges 38' of the fly-weight members 37 so that the axially movable member 21 and therewith effectively also the pressure disk 44 are lifted off from the clutch disk 19 in opposition to the spring forces exerted thereon by springs 22 and 23. As a result thereof, the clutch becomes disengaged.

Figure 7:
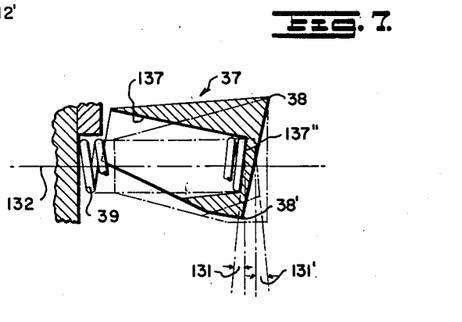
FIGURE 7 is a partial cross-sectional view, similar to FIGURE 1 of a modified embodiment of a fly-weight arrangement for the centrifugal clutch in accordance with the present invention.

FIGURE 7 illustrates a modified embodiment of a centrifugal clutch construction in which the bottom 137" of the recess 137 within each fly-weight 37 is inclined in such a manner that in the two end positions thereof it subtends the same angle 131 and 131' with respect to a line perpendicular to the axis 132 of the springs 39, with each angle 131 and 131' being disposed on opposite sides of this perpendicular. By the use of such an arrangement, there is provided a counter-effect to the tendency of the spring 39 to buckle or bend out of the longitudinal axis thereof. However, it is also understood that by changing this inclination of the bottom surface 137" in any other direction, the tendency to buckle on the part of the spring 39 may be influenced in a predetermined direction, and possibly may be aided thereby whereby a change in the engaging and disengaging rotational speeds at which the fly-weights operate is rendered posssible.

While the particular centrifugal clutch construction disclosed herein for actuating the engagement and disengagement of the clutch is particularly suitable for purposes of a force-locking clutch in accordance with the present invention, it is understood that its use is not limited thereto but that it may also be used in connection with other clutch arrangements thereby assuring also the advantages obtainable in connection therewith to such other clutch arrangements.

As described hereinabove, one spring 39 each, which is of helical construction and is arranged inside of the knife edge bearing, is coordinated to each fly-weight 37; each spring 39 seeks to pivot the respective fly-weight 37 in a direction opposite to the engaging direction of the axially movable member 21 and therewith also in opposition to the spring forces exerted by springs 22 and 23 on the flange member 36 of the axially movable part 21.

The spring disks 40 of several spring elements 41 also abut against the flange member 36 (lower part of FIGURE 1) whereby one spring element 41 each together with a spring disk 40 is arranged on each bolt member 16. The other spring disk 42 of each spring element 41 abuts thereby against a corresponding flange portion 43 provided at the pressure disk 44. The pressure disk 44 is thereby moved or resiliently urged at all times in the direction toward the clutch disk 19 by the spring element 41 whereby the stroke of this spreading spring 41, however, is smaller than the stroke of the fly-weights 37 between the two end positions thereof.

The pressure disk 44 serves simultaneously as synchronizing means, and for that purpose is operatively connected by means of blocking surfaces 45 and 45' (FIGURES 1 and 3) with the axially movable part 21, and is rotatable with respect thereto within predetermined limits. The blocking surfaces 45 and 45' are provided, as shown in FIGURE 3, at the claw-members 46 of the pressure disk 44 and at the counter-claw-members 47 of the axially movable part 21, respectively. The blocking surfaces 45 and 45' are so inclined that, with a pulling or driving engine, rotating in a direction indicated by arrow B in FIGURE 3, an axial thrust is produced thereby which is effective on the axially movable part 21 in a direction opposite to the engaging direction thereof. The operation of the synchronization and attainment of the force-locking position are essentially analogous to that described in the copending application Serial No. 684,021, filed September 16, 1957, now Patent No. 2,967,598 and entitled "Shifting Arrangement for Change Speed Gears" and United States Patent 2,942,713, both assigned to the assignee of the instant application. The basic operation is the same in the present case as described in the earlier application. If the surfaces 45 and 45' abut against one another, which is always the case when the engine pushes the vehicle as in that case the part 10 drives the axially movable part 21 and the latter pushes the pressure disk 44 in front thereof, then an axial thrust becomes effective which seeks to displace the pressure disk 44 toward the left, i.e., in the engaging direction therof, and the axially-movable part 21 toward the right, i.e., opposite the engaging direction thereof, as viewed in FIGURES 3 to 5. These forces are effective both in the synchronization position G and in the force-locking position K (FIGURE 3), only in the latter position the axial thrust produced at the surface 30 is larger, as also explained in the specification of the two aforementioned applications.

The same claw-members 46 and 47 are also provided with wedging surfaces 48 and 48' by means of which a free-wheeling effect is achieved below the gripping rotational speed of the fly-weights 37. In order that the claw-members 46 and counter-claw-members 47 abut at all times against one another with the wedging surfaces 48 and 48' thereof, a tangential spring 49 (FIGURE 2) is arranged which is hooked into the pin member 50 of the fly-wheel part 11 and into the pin member 51 of a counter plate 52 (FIGURES 1 and 2). This spring 49 retains the pressure disk 44 constantly in abutment at the wedging surfaces 48 thereof in the forward direction of rotation.

The counter plate 52 is disposed on the opposite side of the clutch disk 19 as shown in FIGURE 1. The counter plate 52 is thereby supported with respect to the driving clutch part 11 by roller bearings 53 and is operatively connected with the pressure disk 44 by means of claw members 54 so as to be axially movable with respect thereto while at the same time being connected for common rotation therwith. Ball members or other roller bodies 55 are inserted between the claw 54 in order to reduce as much as possible any friction between these parts 52 and 44.

A spring 56 (FIGURE 1) acts on a disengaging lever 26 which spring 56 is operatively connected with the gas pedal 57 or with any other suitable adjusting member for the driving engine. A lost-motion connection 58 is so interposed between the spring 56 and the gas pedal 57 that only with a predetermined position of the gas pedal 57, for example, with one third of its stroke, the spring 56 is spring-tensioned whereby, however, it is always a prerequisite that the disengaging lever 26 is in the position thereof corresponding to the synchronizing position of the pressure disk 44.

*Operation*

The operation of the clutch described hereinabove will now be explained in detail by reference also to the schematic showing of FIGURE 5. In this figure, the inclined and oblique surfaces as well as the springs have to be imagined as being displaced in a plane. In the same manner, the movement of the clutches and the parts thereof have to be envisioned, not as rotational movements but as translatory movements.

Figure 5:
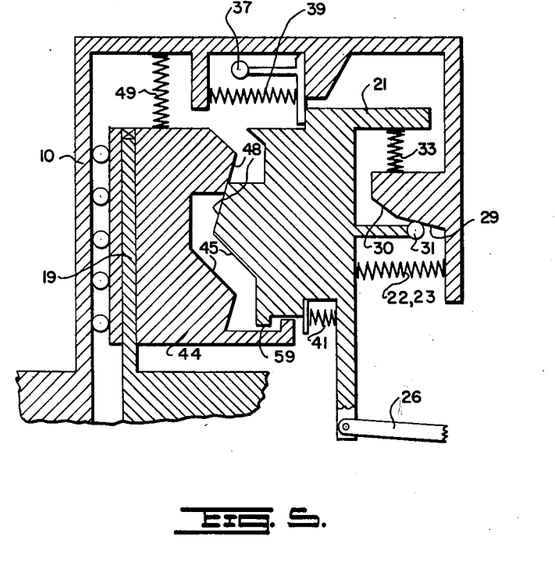
FIGURE 5 is a schematic view of the clutch construction in accordance with the present invention intended to facilitate understanding of the operation thereof.

FIGURE 5 shows the clutch in the free-wheeling position thereof if it is assumed that the vehicle stands still or merely creeps and the engine rotates at the idling speed thereof. In this position, the clutch part 10 operatively connected with the engine rotates more rapidly than the cluch disk 19 operatively connected with the vehicle through shaft 17. As a result thereof, no axial thrust is produced along the wedging surfaces 48 which would be capable of pressing the pressure disk 44 against the clutch disk 19. This is so as in the freewheeling position the clutch disk 19 rotates more slowly than the part 10 and the pressure disk abuts against the clutch 19 so that the pressure disk 44 also seeks to rotate more slowly than the axially-movable part 21. While the spring 49 pulls the pressure disk toward the axially-movable part 21 in the forward direction of rotation which normally would produce an axial thrust for the pressure disk 44 toward the left, i.e., in the engaging direction thereof, this axial thrust does not become effective by reason of the braking effect exerted by the clutch disk 19 on the pressure disk 44. Any movement of the axially-movable part 21 toward the left, i.e., in the engaging direction thereof, caused by the axial thrust at the surfaces 29, is thereby prevented by the flyweights 37. The wedging surfaces 48 are retained in mutual abutment exclusively by the spring 49. The fly-weights 37 are returned under the pressure exerted thereon by springs 39 into the inner position thereof and thereby absorb every force effective at the axially movable part 21 in the engaging direction thereof. The clutch is, therefore, practically disengaged and the engine runs freely.

If the pressure disk 44 is to be completely disengaged out of the position indicated in the drawing and the clutch is thereby to be completely disengaged, then the axially movable part 21 is moved toward the right by the disengaging lever 26. The axially movable part 21 thereby takes along, by means of abutment 59, the pressure disk 44 so that the latter is lifted off completely from the clutch disk 19. The abutment 59 is arranged, as shown in FIGURE 1, at the claws 47 of the axially movable part 21.

The engagement of the clutch from the position illustrated in the drawing takes place as follows:

By giving gas, the engine is accelerated so that the clutch part 10 operatively connected therewith and the fly-weights 37 increase in rotational speed thereof. The fly-weights 37 thereby pivot in the clockwise direction against the force exerted thereon by springs 39 and release the axially movable part 21 for movement toward the left in the engaging direction. The springs 22 and 23 thereby displace the axially movable part 21 toward the left as viewed in FIGURE 1. Simultaneously therewith, an axial thrust in the engaging direction is produced at the cylindrical pin member 31 on the inclined surfaces 29 (FIGURE 4) from the tangential springs 33. While it is true that the main purpose of the springs resides in assuring abutment between the parts 28 and 31 when the vehicle pushes the engine, these springs also are effective to contribute to the axial thrust produced at the surfaces 29 and 30 when the engine drives the vehicle. This is so as the total axial thrust which is produced at the surfaces 29 and 30 and which seeks to displace the axially-movable part 21 in the engaging direction, is composed of two portions, namely, the aforementioned portion produced by the springs 33 and the portion produced from the torque.

The axially movable part 21 now displaces, by means of spring elements 41, the pressure disk 44 in front of itself and causes abutment of the pressure disk 44 against the clutch disk 19. As a result thereof, the clutch pressure disk 44 is rotated by a predetermined amount with respect to the axially movable part 21 so that the wedging surfaces 48 and 48' are lifted from one another and the blocking surfaces 45 and 45' come into mutual abutment. The friction moment between the pressure disk 44 and the clutch disk 19 is automatically converted by the inclined surfaces 29 (FIGURE 4) into an axial thrust and is reinforced thereby in a servo-like manner. This position is indicated in FIGURE 3 by the dot and dash line designated by reference character G. This is the so-called synchronization position in which, by reason of the mutual matching of the springs and of the inclination of the inclined or slanted surfaces 29 only a limited torque, for example, 8 mkg. can be transmitted.

A further movement toward the left of the axially movable part 21 is now prevented by the blocking surfaces 45 and 45' as long as the pressure disk 44 exhibits any relative movement with respect to the clutch disk 19. As soon as synchronism exists at both clutch parts 19 and 44, this blocking action ceases, and the springs 22 and 23 as well as the axial thrust produced by the torque move the axially movable part 21 completely toward the left as viewed in FIGURE 1 until it reaches the force-locking position thereof designated in FIGURE 3 by reference character K. The cylindrical pin members 31 thereby abut in this force-locking position K against the more strongly slanted inclined surfaces 30 and produce thereat together with the spring forces such a large axial thrust that the entire torque, for example, 16 mkg. can be transmitted. The clutch is thereby fully engaged.

If the foot is taken off from the gas pedal above the gripping rotational speed of the centrifugal actuating mechanism, i.e. with the fly-weights 37 displaced radially outwardly, then the engine is pulled by the vehicle by means of the tangential springs 33 without, however, permitting the cylindrical pin members 31 to become disengaged from the inclined surfaces 30. If the rotational speed, however, drops below the gripping rotational speed of the fly-weights 37, then the latter displace the axially movable part 21 again toward the right as viewed in FIGURE 1. At first, the pressure disk 44 is retained thereby in the frictional engagement with the clutch disk 19 by the spring elements 41. Only during the latter part of this stroke the spring element 41 becomes ineffectual.

Since the engine now rotates slower than the vehicle, the wedging surfaces 48 and 48' come into mutual abutment and push the pressure disk 44 against the clutch disk 19 sufficiently securely in order to absorb safely the thrust moment of the engine. This means in practice that the free-wheeling of the engine is blocked in this condition.

With the construction of the clutch described so far, only a predetermined torque could be transmitted always in the synchronizing position thereof. While giving gas, i.e., for example during shifting while giving gas, the engine would unnecessarily race and would produce friction at the pressure disk 44 and the counter-plate 52 thereof with respect to the clutch disk 19. In order to avoid this, the gas pedal 57 is operatively connected with the disengaging lever 26 by means of an auxiliary spring 56. A lost-motion connection 58 is thereby inserted so that the spring 56 becomes effective only from a predetermined position of the gas pedal 57.

If the disengaging lever 26 is in the position thereof corresponding to the synchronizing position of the pressure disk 44 and if the gas pedal is depressed beyond a predetermined position, for example, to full throttle, then the spring 56 is tensioned thereby and exerts a pressure on the axially movable part 21 in addition to that of the springs 22 and 23 and the axial thrust produced by the inclined surfaces 29. This force is sufficient in order to achieve already now in the synchronizing position the force-locking engagement between the pressure disk 44 and the clutch disk 19 and therewith to prevent a racing of the engine and unnecessary friction losses resulting therefrom.

While the overall clutch construction in accordance with the present invention utilizes preferably a centrifugally-actuated clutch including the fly-weight arrangement in accordance with the present invention, it is understood that the present invention is not limited thereto but may also be used with centrifugally actuated clutches of constructions different from that shown herein, even though the use of a centrifugal clutch construction in accordance with the present invention is preferable as it further improves the overall operation of the force-locking clutch and increases the overall efficiency and reliability of operation thereof.

Furthermore, it is also understood that the centrifugal clutch construction as disclosed herein may be used also to advantage in other clutch constructions.

Thus, while we have described several embodiments in accordance with the present invention, it is understood that the same is not limited thereto but is susceptible of many changes and modifications within the spirit and scope of the present invention, and we, therefore, do not wish to be limited to the details shown and described herein but intend to encompass all those changes and modifications as are encompassed by the scope of the appended claims.

We claim:

1. A disengageable, force-locking clutch, comprising driving clutch means and driven clutch means, axially movable means arranged adjacent one of said clutch means and adapted to be selectively connected with the other clutch means, and synchronizing and blocking means intermediate said driving and driven clutch means for establishing synchronism therebetween and for preventing the force-locking engagement essentially until synchronism is attained between said two clutch means, said last-named means being constituted in part by inclined engaging surfaces on said axially movable means and said one clutch means for producing an axial thrust in the engaging direction of said axially movable means from the friction moment, and spring means keeping said inclined surfaces in essentially constant abutment with each other.

2. A disengageable, force-locking clutch according to claim 1, further comprising fly-weight means for preventing engagement of said axially movable means with said other clutch means below a predetermined rotational speed of said one clutch means including means effectively constituting a knife-edge bearing for said fly-weight means within a part of the clutch operatively connected with said one clutch means.

3. A disengageable, force-locking clutch according to claim 1, wherein the inclined engaging surfaces at said one clutch means have two surface portions defining, respectively, a synchronizing position and a force-locking position, said surface portion corresponding to the synchronizing position being of smaller inclination than the surface portion corresponding to the force-locking position, and essentially radially-extending pin means at said axially movable part adapted to cooperate with said inclined engaging surfaces.

4. A disengageable force-locking clutch according to claim 1, further comprising spring means for pre-tensioning said axially movable means against the forward direction of rotation with respect to said one clutch means, the pre-tensioning force being larger than the thrust moment of the vehicle engine.

5. A disengageable, force-locking clutch according to claim 1, further comprising spring means between said one clutch means and said axially movable means operative in the engaging direction, the pre-tension of said last-mentioned spring means together with the axial thrust produced by said inclined engaging surfaces and said first-mentioned spring means being so matched to each other that in the synchronizing position of the clutch parts only a limited engine torque can be transmitted by the clutch which lies below the maximum engine torque.

6. A disengageable, force-locking clutch according to claim 5, further comprising engine control means, and means including spring means operatively connecting said engine control means with said axially movable means to reinforce the pressure on the latter in the engaging direction in such a manner that the full engine torque may also be transmitted in the synchronizing position of the clutch parts.

7. A disengageable, force-locking clutch according to claim 5, further comprising a gas pedal for the engine, a clutch disengaging lever for selectively actuating said axially movable means, and means including spring means and a lost-motion connection between said clutch disengaging lever and said gas pedal to provide a pre-tensioning of said last-mentioned spring means only with a predetermined position of said gas pedal with said disengaging lever in the position thereof corresponding to the synchronizing position.

8. A disengageable, force-locking clutch according to claim 7, further comprising spring-loaded fly-weight means for preventing engagement of said axially movable means below a predetermined rotational speed of said one clutch means, said fly-weight means being provided with an edge portion effectively constituting a knife-edge bearing within a part of the clutch operatively connected with said one clutch means.

9. A disengageable centrifugal clutch construction, especially for motor vehicles, having a driving clutch part, comprising axially movable means including pressure disk means operatively connected with said driving clutch part, clutch disk means, clutch spring means normally urging said pressure disk means in the engaging direction thereof, and fly-weight means for preventing engagement of said pressure disk means with said clutch disk means below a predetermined rotational speed of said driving clutch part, said fly-weight means comprising a hollow block-like part, an edge portion of which effectively constitutes a knife-edge bearing within a part of the clutch operatively connected with said driving clutch part and spring means arranged within the hollow of said block-like part and supported without the same for spring-loading said block-like part.

10. A centrifugal clutch construction according to claim 9, wherein a surface at said driving clutch part which extends essentially perpendicularly to the clutch axis serves as abutment surface for said fly-weight means.

11. A centrifugal clutch construction according to claim 9, wherein said fly-weight means are arranged along sectors of said driving clutch part means in such a manner that said edge portions form a regular polygon within the circumference of said driving clutch part.

12. A disengageable, centrifugal clutch construction according to claim 9, wherein said fly-weight means is secured at said driving clutch part essentially in the tangential direction including securing means at said driving clutch part engaging in a cut-out portion provided in said fly-weight means within the area of the edge portion thereof serving as said knife-edge bearing.

13. A disengageable, centrifugal clutch construction having a driven clutch part according to claim 12, further comprising means to provide a force-locking engagement between said driving and driven clutch parts including synchronizing and blocking means intermediate said two clutch parts for establishing synchronism therebetween and for preventing the force-locking engagement essentially until synchronism is attained between said two clutch parts, said last-named means being effectively formed by inclined surface means at said axially movable means and at said driving clutch part for producing an axial thrust in the engaging direction from the friction moment, and spring means effective approximately in the tangential direction for keeping said inclined surface means essentially in constant abutment with one another.

14. A disengageable, force-locking clutch, especially main clutch for motor vehicle, comprising a driving clutch member and a driven clutch member, an axially movable part arranged at one of said clutch members and provided with surface means to provide an engagement with the other clutch part, synchronizing means intermediate said two clutch parts for establishing synchronism, blocking means intermediate said two clutch parts for preventing the force-locking engagement therebetween until synchronism is attained, said axially movable part and said one clutch member being provided with inclined surface means for producing an axial thrust in the engaging direction of said axially movable part from the friction moment, essentially tangentially effective spring means keeping said inclined surface means in essentially constant abutment with each other, and spring-loaded fly-weight means in said driving clutch part for releasing said axially movable part for engagement thereof only above a predetermined rotational speed of said driving clutch part.

15. A disengageable, force-locking clutch according to claim 14, wherein said synchronizing means includes pressure disk means, said blocking means being constituted by blocking surfaces operatively connecting said pressure disk means with said axially movable part to enable a limited relative movement therebetween, and said pressure disk means being adapted to be moved by said axially movable part beyond the stroke of said fly-weight means in the disengaging direction thereof.

16. A disengageable, force-locking clutch according to claim 15, further comprising pre-tensioning spring means for pre-tensioning said pressure disk means in the forward direction of rotation thereof to obtain effectively a free-wheeling effect below the gripping rotational speed of said fly-weight means, and wedging surface and counter surface means at said pressure disk means and said axially movable part to enable attainment of said free-wheeling effect.

17. A disengageable, force-locking clutch according to claim 16, wherein said pressure disk means and said axially movable part are provided with claw portions on which said wedging surface means and said blocking surfaces are structurally combined in such a manner that the wedging surface means can come into effective abutment only if the axially movable part is lifted off by said fly-weight means from said pressure disk means.

18. A disengageable, force-locking clutch according to claim 17, further comprising spreading spring means between said axially movable part and said pressure disk means, the effective stroke of said spreading spring means being smaller than the stroke of said axially movable part to be released by said fly-weight means.

19. A disengageable, force-locking clutch according to claim 18, wherein said spreading spring means are evenly distributed over the circumference of said driving clutch part intermediate the sectors provided with said fly-weight means, bolt means extending essentially parallelly to the axis of the clutch for supporting thereon said spreading spring means, and spring disk means arranged axially between said spreading spring means and flange portions provided at said pressure disk means and said axially movable part.

20. A disengageable, force-locking clutch according to claim 19, wherein said driving clutch part includes a starter ring gear, a fly-wheel part and a bell-shaped clutch cover, and wherein said bolt means serve for securing together the component parts of said driving clutch part.

21. A disengageable, force-locking clutch according to claim 20, further comprising counter plate means operatively connected with said clutch pressure disk means to provide common rotation therebetween while enabling axial movement relative to one another, said counter plate means being located on the opposite side of said driven clutch member, and roller bearing means for supporting said counter plate means at said driving clutch part.

22. A disengageable, force-locking clutch according to claim 21, further comprising claw means at said counter plate means and said pressure disk means, and anti-friction means interposed between said last-mentioned claw means for operatively connecting the latter.

23. A disengageable, force-locking clutch according to claim 22, wherein said spring means producing said free-wheeling effect are arranged between said counter plate means and said driving clutch part.

24. A disengageable, force-locking clutch according to claim 23, wherein said fly-weight means are provided with an edge portion effectively constituting a knife-edge bearing within a part operatively connected with said driving clutch part, each of said fly-weight means being constructed of essentially block-like shape and provided with another edge portion for actuation of a flange portion at said axially movable part, the edge portion constituting said knife-edge bearing being disposed radially outwardly of the edge portion actuating said axially movable part, and both edge portions being essentially parallel to one another, each of said fly-weight means being provided with a recess for accommodating therein a coil spring supported at one end thereof against the bottom of said recess and at the other end thereof against said driving clutch part.

25. A disengageable, force-locking clutch according to claim 24, wherein the bottom of said recess within each fly-weight means is so inclined that in both end positions of said fly-weight means it forms the same but opposite angles with the perpendicular to the axis of the spring.

26. A disengageable, force-locking clutch according to claim 25, further comprising pin means at said driving clutch part and extending into a cut-out portion provided within the region of said first-mentioned edge portion to secure said fly-weight means at said driving clutch part in the tangential direction thereof.

27. A centrifugal clutch, especially for motor vehicles, having a driving clutch part, comprising axially movable means including pressure disk means operatively connected with said driving clutch part, clutch-disk means, clutch spring means normally urging said pressure disk means in the engaging direction thereof toward said clutch disk means, and spring-loaded fly-weight means for preventing engagement of said pressure disk means with said clutch disk means below a predetermined rotational speed of said driving clutch part, said fly-weight means being supported along an edge effectively constituting a knife-edge bearing within the part of the clutch operatively connected with the driving clutch part, each fly-weight means being provided with a recess, and fly-weight spring means accommodated within said recess and supported at one end thereof against the bottom of said recess and at the other end thereof against said driving clutch part.

28. A centrifugal clutch according to claim 27, wherein said fly-weight means are of essentially block-like shape, and wherein said fly-weight spring means extend essentially parallelly to the clutch axis.

29. A centrifugal clutch according to claim 27, wherein the bottom of said recess is inclined with respect to a line perpendicular to the axis of said fly-weight spring means in such a manner that in both end positions of said fly-weight means approximately equal but oppositely directed angles are subtended with said line.

30. A centrifugal clutch according to claim 29, further comprising pin means at said driving clutch part and engaging into a slot in said fly-weight means provided within the region of said edge portion for securing said fly-weight means in the tangential direction thereof.

31. A centrifugal clutch according to claim 27, wherein said fly-weight means are of block-shaped construction provided with actuating means in the form of another edge portion, said axially movable means including a flange portion adapted to be actuated by said another edge portion, the edge portion serving as knife-edge bearing being disposed radially outwardly of said another edge portion.

32. A disengageable, force-locking clutch, especially main clutch for motor vehicles, comprising a driving clutch member and a driven clutch member, axially movable means arranged at one of said clutch members and adapted to be moved into force-locking engagement with the other clutch part, synchronizing and blocking means having a synchronizing position and a force-locking position arranged intermediate said two clutch parts for establishing synchronism and for preventing the force-locking engagement therebetween until synchronism is attained including inclined surface means at said axially movable part and said one clutch member for producing an axial thrust in the engaging direction of said axially movable means from the friction moment, and spring means effective essentially in the tangential direction for keeping said inclined surface means in essentially constant abutment with each other.

33. A disengageable, force-locking clutch according to claim 32, wherein said inclined surface means include a first surface portion having a lesser inclination and corresponding to the synchronizing position than the surface portion corresponding to the force-locking position, and radially-extending cylindrical pin means at said axially movable means for cooperation with said inclined surface means.

34. A disengageable, force-locking clutch according to claim 33, further comprising bearing means for supporting said cylindrical pin means within said axially movable means in such a manner that the part of said pin means intended for abutment at said inclined surface means is disposed between two bearings arranged at the ends of each pin means.

35. A disengageable, force-locking clutch according to claim 34, further comprising a plurality of tangential spring means for pre-tensioning said axially movable means in the forward direction of rotation with respect to said driving clutch member, the pre-tension of said last-mentioned spring means being selected larger than the thrust moment of the engine.

36. A disengageable, force-locking clutch according to claim 35, further comprising additional spring means disposed between said driving clutch member and said axially movable means and effective in the engaging direction, the pre-tension of said additional spring means together with the axial thrust produced by the inclined surface portions corresponding to the synchronizing position and said tangential spring means being so selected that in the synchronizing position only a limited torque can be transmitted by said clutch which is below the maximum engine torque.

37. A disengageable, force-locking clutch according to claim 36, further comprising engine control means, and means including auxiliary spring means rendered effective upon actuation of said engine control means for reinforcing the pressure exerted on said axially movable means in the engaging direction thereof to enable transmission of the full engine torque also in the synchronizing position.

38. A disengageable, force-locking clutch, according to claim 37, further comprising lost-motion connecting means intermediate said engine control means and said auxiliary spring means, and means at said axially movable means for producing a free-wheeling effect in said clutch below a predetermined speed of said driving clutch member.

39. A disengageable clutch according to claim 32, further comprising centrifugally-actuated, speed-responsive means for releasing said axially movable means for engagement thereof only above a predetermined speed of said driving clutch member, and means operatively connected with said axially movable means and effective simultaneously as synchronizing means for producing a free-wheeling effect below the effective rotational speed of said speed-responsive means.

40. A disengageable clutch according to claim 32, further comprising spring-loaded fly-weight means in said driving clutch member for releasing said axially movable means in the engaging direction only above a predetermined rotational speed of the driving clutch member, a pressure disk effective simultaneously as synchronizing means and operatively connected with said axially movable means to enable limited relative movement therebetween, said pressure disk being adapted to be displaced by said axially movable means beyond the stroke of said fly-weight means in the disengaging direction, and means for producing a free-wheeling effect below the gripping rotational speed of said fly-weight means for pre-tensioning said pressure disk in the forward direction of rotation and wedging surface means at said pressure disk for abutment with complementary counter surfaces at said axially movable means for producing said free-wheeling effect.

41. A disengageable clutch according to claim 40, further comprising spring means between said axially movable means and said pressure disk and seeking to spread the same apart, the effective stroke of said last-mentioned spring means being smaller than the stroke of said axially movable means released by said fly-weight means.

42. A disengageable, force-locking clutch according to claim 32, wherein said locking means includes pressure disk means, and wedging and blocking surface means provided between said pressure disk means and said axially movable means to enable a limited relative movement therebetween during change from the disengaged to the synchronizing and to the force-locking positions, and counter plate means operatively connected with said clutch pressure disk means for common rotational movement therewith but enable relative axial displacement therebetween, said counter plate means being disposed on the other side of said driven clutch member, and means for rotatably supporting said counter plate means within said clutch.

43. A disengageable clutch according to claim 42, further comprising means including spring means between said counter plate means and said driving clutch member for providing a free-wheeling effect within said clutch below a predetermined rotational speed of said driving clutch member.

References Cited in the file of this patent
UNITED STATES PATENTS
2,090,397     Haupt _______________ Aug. 17, 1937